United States Patent
Rühl

[11] Patent Number: 5,244,331
[45] Date of Patent: Sep. 14, 1993

[54] APPARATUS FOR POSITIONING A ROTARY MEMBER ON A BALANCING MACHINE

[75] Inventor: Klaus Rühl, Gross-Ostheim, Fed. Rep. of Germany

[73] Assignee: Hofmann Werkstatt-Technik GmbH, Pfungstadt, Fed. Rep. of Germany

[21] Appl. No.: 832,999

[22] Filed: Feb. 10, 1992

[30] Foreign Application Priority Data

Mar. 20, 1991 [DE] Fed. Rep. of Germany ....... 4109187

[51] Int. Cl.$^5$ .............................................. B60B 29/00
[52] U.S. Cl. .................................... 414/429; 414/428; 414/917; 29/273
[58] Field of Search ............... 414/426, 428, 429, 466, 414/917; 254/104; 269/902; 29/273

[56] References Cited

U.S. PATENT DOCUMENTS

| | | | |
|---|---|---|---|
| 2,226,789 | 12/1940 | Tupy | 414/917 X |
| 3,734,304 | 5/1973 | Cabaniss | 414/428 X |
| 3,830,387 | 8/1974 | Virnig | 414/429 X |
| 4,462,776 | 7/1984 | Fujimoto et al. | 414/428 X |
| 4,618,309 | 10/1986 | Gregg et al. | 414/917 X |
| 4,690,605 | 9/1987 | Coccaro | 414/429 |

FOREIGN PATENT DOCUMENTS

| | | | |
|---|---|---|---|
| 2524480 | 12/1976 | Fed. Rep. of Germany | 414/911 |
| 0069072 | 6/1977 | Japan | 414/426 |
| 2066206 | 7/1981 | United Kingdom | 414/426 |

Primary Examiner—David A. Bucci
Assistant Examiner—James Keenan
Attorney, Agent, or Firm—Cushman, Darby & Cushman

[57] ABSTRACT

Apparatus for positioning a rotary member such as a vehicle wheel at a balancing machine in such a way that the rotary member can be lifted into a position, at the level of the balancing machine measuring spindle, in which the longitudinal center lines of the measuring spindle and the rotary member are aligned with each other and the rotary member can be moved concentrically relative to the measuring spindle. The apparatus has two equal-length positioning arms which are pivotally connected at an apex point in a scissor-like arrangement and which are pivotable uniformly relative to each other about their connecting point in a plane which is perpendicular to the measuring spindle. The positioning arms connecting point is displaceable along a line which is perpendicular to the longitudinal center line of the measuring spindle and which coincides with the line bisecting the angle formed by the positioning arms. A support member for supporting the rotary member from below and an abutment member for bearing against the rotary member in its upper portion are mounted to respective ones of the positioning arms at mounting points such that upon displacement of the positioning arms in the opposite direction to the longitudinal center line of the measuring spindle, the mounting points of the support member and the abutment member move along a common straight line towards the longitudinal center line of the measuring spindle.

12 Claims, 2 Drawing Sheets

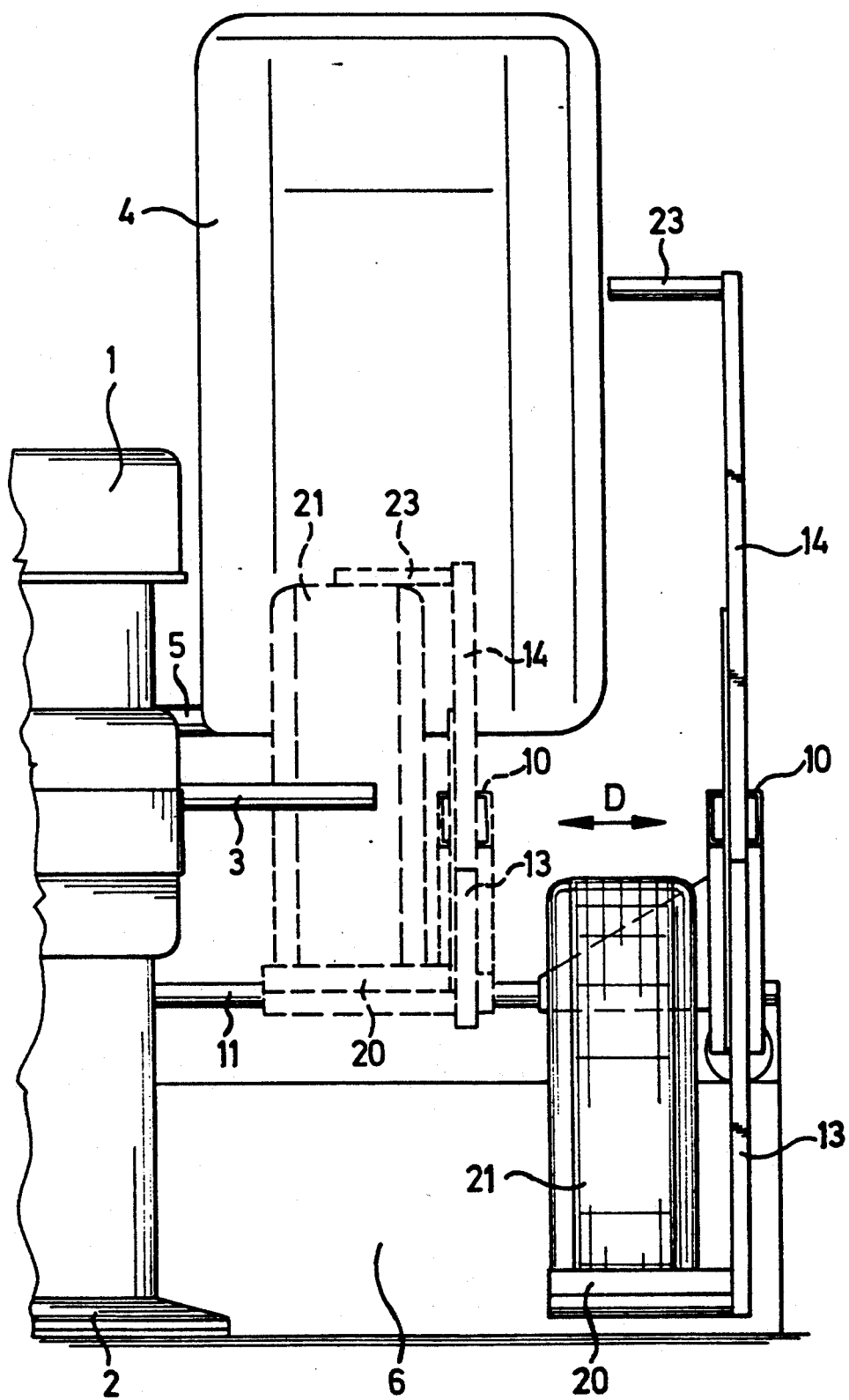

APPARATUS FOR POSITIONING A ROTARY MEMBER ON A BALANCING MACHINE

BACKGROUND OF THE INVENTION

Major difficulties are often encountered when balancing heavy rotary members such as motor vehicle wheels, for example for trucks, tractors and the like, more especially when the wheel has to be mounted on to the measuring spindle of a balancing machine and when the wheel has to be clamped on to the appropriate clamping arrangement on the measuring spindle of the machine. In specific terms, in that procedure the wheel must be raised to the level of the measuring spindle and aligned with respect to the measuring spindle or the clamping device thereon, so that the longitudinal center lines of the wheel and the measuring spindle are in alignment with each other, whereupon the wheel has to be moved on to the measuring spindle to be clamped thereon.

One form of apparatus for positioning a rotary member on a balancing machine having a measuring spindle, in such a way that the rotary member can be lifted into a position at the level of the measuring spindle of the balancing machine, as disclosed for example in German laid-open application (DE-OS) No. 20 05 980, comprises for example a lift carriage with a steerable frame which can be raised and lowered by means of a preferably hydraulically actuated lifting device and which has two horizontally extending fork arms which are connected by way of a transverse bearer. At least one support roller is associated with each fork arm. The fork arms can be moved under the wheel which is to be fitted in position, being disposed in an upright position, whereupon the wheel can be supported against the support rollers, raised in the upright position to the fitment height therefor and moved into the fitting position by an axial turning movement. Such an arrangement is very similar to wheel fitting lifting carriages or wheel lifters for replacing wheels on motor vehicles.

Another form of apparatus, as described in German patent specification No. 1 480 858, comprises a movable mounting unit for heavy motor vehicle wheels with a tire fitted thereon. That mounting unit, which is extremely expensive, comprises a generally fork-shaped base frame structure which is provided with vertically extending guideways and which can also be moved into a position under the wheel to be picked up thereby, similarly to the apparatus described above and as disclosed in German laid-open application No. 20 05 980. The mounting unit further comprises a wheel receiving arrangement with mounting members which are arranged movably on the guideways of the base frame structure, and horizontal support arms for the wheel to be picked up, the support arms being integrally connected to the above-mentioned mounting members and extending between first and second fork arms of the forked base frame structure on respective sides of the wheel. The mounting unit further includes a lifting device for lifting the entire wheel receiving arrangement. The mounting unit additionally includes upper yoke members carrying rollers which run on the rear sides of the vertical guideways, handles which are carried by the yoke members and which are connected to the vertical support members of the wheel receiving arrangement, lower rollers which are also carried by the vertical support members but which run at the front sides of the vertical guideways, and a holding assembly for setting the upper yoke members at the desired angular position.

Another form of wheel lifting device which is especially suitable for a balancing machine is to be found for example in German utility model No. 17 78 921. That assembly has lift supports of a lifting unit, and arranged on the lift supports is a wheel receiving arrangement which is mounted pivotably in the lift supports by means of a mounting pin and has a horizontal member for receiving the wheel, an angular member, a holding member for securing the wheel in its respective position, and a curved support member. While that configuration, unlike the above-described prior apparatuses, is of a comparatively simple structure, it also suffers from the disadvantage that positioning the wheel at the balancing machine involves major problems.

SUMMARY OF THE INVENTION

An object of the present invention is to provide an apparatus for positioning a rotary member in a balancing machine for fitting to the measuring spindle thereof, which is of low cost while nonetheless being reliable and accurate in operation.

Another object of the present invention is to provide an apparatus for positioning a motor vehicle wheel in relation to a measuring spindle of a balancing machine, which is such that even a heavy wheel can be correctly positioned in relation to the measuring spindle without being affected by possible errors on the part of the operator, in such a way that the wheel can be raised to a position at the level of the measuring spindle, at which the longitudinal center lines of the spindle and the wheel are aligned with each other.

Still another object of the present invention is to provide an apparatus for positioning a rotary member in a balancing machine which is of a simple design configuration from the mechanics point of view while nonetheless permitting quick and easy operation thereof.

In accordance with the present invention the foregoing and other objects are achieved by an apparatus for positioning a rotary member, such as a motor vehicle wheel, on a balancing machine having a measuring spindle, in such a way that the rotary member can be lifted into a position at the level of the balancing machine measuring spindle, in which longitudinal center lines of the spindle and the rotary member are aligned with each other, whereupon the rotary member can be moved towards the measuring spindle in concentric relationship therewith. The apparatus comprises first and second positioning arms of at least substantially equal length, which are oriented in a scissor-like relationship with each other and which are pivotable uniformly relative to each other about their apex point, in a plane which is at least substantially perpendicular to the measuring spindle. One of the positioning arms, more especially the lower arm, carries a support member for supporting the rotary member to be lifted, while the other positioning arm carries an abutment or contact member for bearing against the rotary member. The apparatus further has means for displacing the positioning arms with their apex point along a line which is at least substantially perpendicular to the longitudinal center line of the measuring spindle and which at least substantially coincides with the bisector of the angle formed by the positioning arms, in such a way that, upon displacement in the opposite direction to the longitudinal center line of the measuring spindle, the points at which the support member and the abutment member are connected to the respective positioning arms are movable along a common straight line relative to the longitudinal center line of the measuring spindle.

In a preferred feature of the invention the support member is pivotally connected substantially at the center thereof to the respective positioning arm while at least adjacent its first end it is connected to a securing lever which is substantially parallel to that positioning arm and is moved synchronously with respect thereto, in such a way that the rotary member is properly held in position. The abutment member may be a roller which is oriented perpendicularly to the positioning arm on which it is carried.

In another preferred feature of the invention, the positioning arms are pivotally connected at their apex or interconnection point to the piston of a piston-cylinder unit which may be pneumatically actuated and whose stroke direction at least substantially coincides with the line which is perpendicular to the longitudinal center line of the measuring spindle and along which the apex point of the positioning arms is displaceable. First and second link arms of at least substantially equal length may each have a first end stationarily connected to a common point on the line which is perpendicular to the longitudinal center line of the measuring spindle, while the second end of each link arm may be connected to a respective one of the positioning arms.

To align the rotary member with the measuring spindle, the apparatus may include means for displacement of the assembly of the positioning arms, support means and abutment member, in the direction of the axis of the measuring spindle. The displacement means may comprise a guide bar which extends parallel to the measuring spindle and it may be in the form of a shaft member whereby the above-mentioned assembly is adjustably pivotable about the shaft member so that the direction of displacement of the apex point of the positioning arms intersects the axis of the measuring spindle at least substantially at a right angle.

Further objects, features and advantages of the invention will be apparent from the following description of a preferred embodiment.

BRIEF DESCRIPTION OF THE DRAWINGS

FIG. 2 is a side view of the apparatus, once again with components of the apparatus being shown in the positions they adopt for balancing of a wheel carried thereby.

DESCRIPTION OF THE PREFERRED EMBODIMENT

Figure 1:
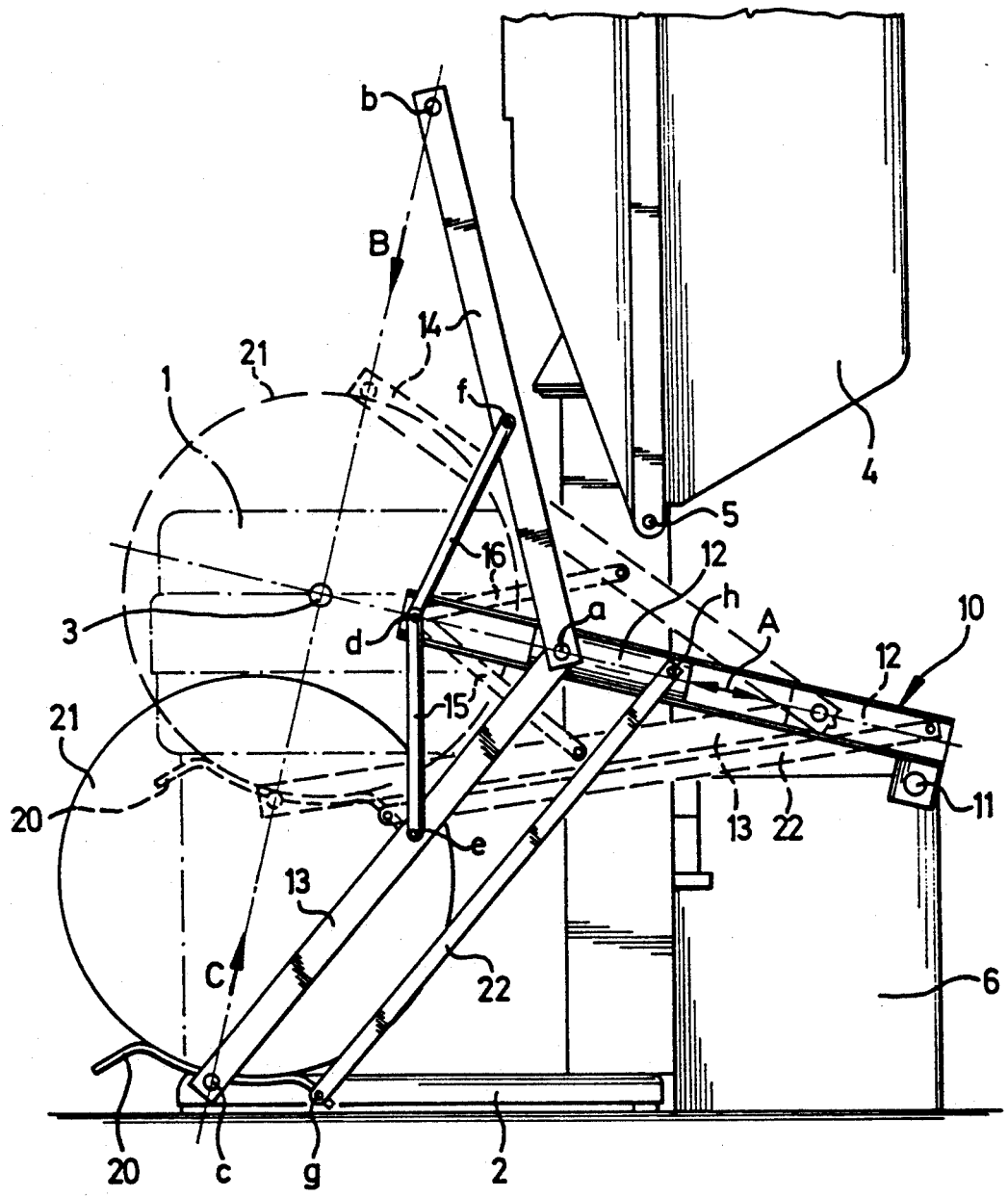
FIG. 1 is a partly broken-away diagrammatic view of a preferred embodiment of the apparatus according to the invention, with the components of the apparatus being shown in broken-line form in the respective positions that they adopt when the apparatus has moved a wheel carried thereby into a position for balancing on a measuring spindle of a balancing machine.

Referring now to the drawing, reference numeral 1 denotes a balancing machine which is known per se and consequently only shown in highly diagrammatic form, for balancing rotary members such as more especially motor vehicle wheels, of which one is indicated at 21 in both FIGS. 1 and 2. The balancing machine 1 is supported on a machine bed or foundation as indicated generally at 2 and has a measuring spindle 3 on which a rotary member or wheel 21 to be balanced can be clamped by means of a suitable clamping unit which is not shown in the drawings. A guard hood 4 which is pivotable about a mounting hinge 3 and which is shown in FIGS. 1 and 2 in the upwardly pivoted, open position can be pivoted downwardly about the mounting hinge 5 into a position in which it covers the rotary member or wheel 21, as a safety factor for the operator.

The apparatus for positioning for example a motor vehicle wheel as indicated at 21 in a position in which the longitudinal center lines of the measuring spindle 3 and the wheel 21 are aligned with each other comprises a machine frame generally indicated at 6, with a shaft 11 which is disposed at least substantially parallel to the longitudinal center line of the measuring spindle 3. A for example pneumatically actuated piston-cylinder unit 10 is mounted on the shaft 11 in such a way that it extends at least substantially perpendicularly thereto. The piston-cylinder unit 10 is displaceable on the shaft 11 as indicated by the double-headed arrow D in FIG. 2 and can be fixed thereon in an appropriate position. The piston-cylinder unit 10 is also pivotable about the shaft 11, in the clockwise or anticlockwise direction as viewing FIG. 1.

In the operative position of the apparatus, the piston-cylinder unit 10 is secured in a pivoted position such that the piston 12 thereof is movable in the direction indicated by the double-headed arrow A in FIG. 1, that is to say along a line which is at least substantially perpendicular to the longitudinal center line of the measuring spindle 3.

The apparatus further comprises first and second positioning arms 13 and 14 of equal length which are pivotable in a plane perpendicular to the longitudinal center line of the spindle 3 and which are arranged in an angular configuration or scissor-like relationship with respect to each other, as shown in FIG. 1. At their apex point as indicated at a in FIG. 1, the positioning arms 13 and 14 are pivotally connected to the piston 12. At equal spacings from the apex point a, the positioning arms 13 and 14 respectively carry an abutment member 23 which is indicated at b in FIG. 1, and which is for example in the form of a roller pivotally mounted to the upper arm 14, and a support member as indicated at 20, in the general configuration of a dish member, which is pivotally mounted to the lower positioning arm at c, providing a support surface for supporting the wheel 21.

The apparatus further comprises first and second link arms 15 and 16, each of which has a first end stationarily connected to a common point on the above-mentioned line which is perpendicular to the longitudinal center line of the measuring spindle 3, which coincides with the direction of movement as indicated by the double-headed arrow A, the first-mentioned ends of the link arms 15 and 16 thus being pivotable about the stationary pivot indicated at d in FIG. 1. The other ends of the link arms 15 and 16 are pivotally connected to the respective positioning arms 13 and 14 at e and f respectively.

Thus, in operation of the apparatus, when the apparatus is initially in the condition shown in solid lines in FIG. 1, when the piston-cylinder unit 10 is actuated in such a way that the piston 12 is displaced towards the right in FIG. 1, the apex point a is similarly displaced towards the right and thus entrains the associated ends of the positioning arms 13 and 14. The co-operation of the positioning arms 13, 14 and the link arms 15, 16 means that the free ends of the positioning arms 13 and 14, as indicated at b and c, move towards each other in the directions indicated by the respective arrows B and C. That means that the apparatus moves into the position shown in broken lines in which the wheel 21 has its axis aligned with the axis of the measuring spindle 3. The assembly consisting of the positioning arms 13, 14 and link arms 15, 16, with the wheel 21 carried thereby, can then be moved along the shaft 11 to fit the wheel 21 on to the measuring spindle 3. Actuation of the piston-cylinder unit 10 in the opposite direction of movement of the piston 12 accordingly returns the components of the apparatus to the position of the components shown in solid lines in FIG. 1.

It will be appreciated that in the lifting movement of the wheel 21, the wheel 21 rests on the support member 20 and is securely carried therein by virtue of its curved configuration. The abutment member 23 comes to bear against the outside peripheral surface or tread of the wheel 21 when the apparatus is in the position shown in broken lines for the components thereof, thereby to ensure that the wheel 21 is only lifted into the position at the level of the measuring spindle 3 of the balancing machine 1, in which the longitudinal center lines of the measuring spindle 3 and the wheel 21 are aligned with each other, and cannot therefore go beyond that position. The co-operation of the support member 20 and the abutment member 23 with the wheel 21 contribute to ensuring that the wheel 21 is moved towards the measuring spindle 3 in concentric relationship therewith.

As can be seen from FIG. 1, the illustrated apparatus further has a securing lever 22 which extends at least substantially parallel to the lower positioning arm 13 and which is desirable movable synchronously therewith. The lower end thereof, as indicated at g, is pivotally connected to an end portion of the support member 20 carried on the positioning arm 13, while the other end of the lever 22, as indicated at h, is pivotally connected to the piston 12 of the piston-cylinder unit 10. When the wheel 21 is being lifted to the level of the measuring spindle 3, the securing lever 22 serves to ensure that the support member 20 cannot tilt, thus preventing the wheel 21 from falling off the support member 20.

It will be seen from the foregoing therefore that the positioning arms 13 and 14 are uniformly pivotally moved relative to each other about their apex point a in a plane perpendicular to the measuring spindle, and the apex point a of the positioning arms 13 and 14 is displaced along the line (double-headed arrow A) which is perpendicular to the longitudinal center line or axis of the measuring spindle 3 and which coincides with the bisector of the angle formed by the positioning arms 13 and 14. In that arrangement, upon displacement in a direction opposite to the longitudinal center line or axis of the measuring spindle 3, the points b and c at which the support member 20 for the wheel 21 and the abutment member 23 are connected to the respective positioning arms 13 and 14 are movable along a common straight line, as indicated by the arrows B and C, relative to the longitudinal center line or axis of the measuring spindle 3. It will be noted that the assembly of the positioning arms 13, 14 and the support member 20 is adjustably pivotable about the guide member formed by the shaft 11, in such a way that the direction of displacement of the apex point a of the positioning arms 13, 14 intersects the axis of the measuring spindle 3 at least substantially at a right angle, while the abutment member 23 is preferably a roller oriented perpendicularly to the positioning arm 14 on which it is carried.

It will be appreciated that the above-described apparatus which is essentially based on a scissor or tongs-action principle provides for satisfactory positioning of the wheel to be balanced, with virtually no susceptibility to error by intervention of an operator, while nonetheless being of a comparatively simple and inexpensive structure.

It will be appreciated that the above-described apparatus has been set forth solely by way of example and illustration of the principles of the present invention and that various modifications and alterations may be made therein without thereby departing from the spirit and scope of the invention.

What is claimed is:

1. Apparatus for positioning a rotary member at a balancing machine having a measuring spindle, in such a way that the rotary member can be lifted into a position at the level of the measuring spindle of the balancing machine, in which the longitudinal center line of the measuring spindle and the axis of rotation of the rotary member are aligned with each other, and the rotary member can be moved concentrically towards the measuring spindle, comprising: first and second positioning arms of at least substantially equal length; means mounting the positioning arms in substantially scissor-like relationship with each other about an apex point; a support means for a said rotary member, which is carried by said first positioning arm; an abutment member for bearing against the rotary member, which is carried by the second positioning arm; and means for uniform pivotal movement of the positioning arms relative to each other about their apex point in a plane perpendicular to the measuring spindle and for displacement of the apex point of the positioning arms along a line which is perpendicular to the longitudinal center line of the measuring spindle and coincides with the bisector of the angle formed by the positioning arms, in such a way that upon displacement in a direction opposite to the longitudinal center line of the measuring spindle, the points at which said support means and said abutment member are connected to the respective positioning arms are movable along a common straight line relative to the longitudinal center line of the measuring spindle.

2. Apparatus as set forth in claim 1 and further including a securing lever which is disposed substantially parallel to said first positioning arm and which is moved synchronously relative to said first positioning arm, wherein said support means is a support member having first and second ends and connected at a location intermediate the ends thereof to the first positioning arm and in addition at least adjacent its first end to said securing lever.

3. Apparatus as set forth in claim 2 wherein said displacement means comprises a piston-cylinder means whose stroke direction at least substantially coincides with the line which is perpendicular to the longitudinal center line of the measuring spindle and which the apex point of the positioning arms is displaceable, and wherein the positioning arms are pivotally connected at their apex point to the piston of the piston-cylinder means, and wherein the securing lever is guided at its end remote from the support means at the piston of the piston-cylinder means in substantially parallel relationship to the first positioning arm.

4. Apparatus as set forth in claim 1 wherein said abutment member is a roller which is oriented at least substantially perpendicularly to the second positioning arm.

5. Apparatus as set forth in claim 1 wherein said displacement means comprises a piston-cylinder means whose stroke direction at least substantially coincides with the line which is perpendicular to the longitudinal center line of the measuring spindle and along which the apex point of the positioning arms is displaceable, and wherein the positioning arms are pivotally connected at their apex point to the piston of the piston-cylinder means.

6. Apparatus as set forth in claim 5 wherein said piston-cylinder means is a pneumatically actuated piston-cylinder unit.

7. Apparatus as set forth in claim 1 and further comprising first and second link arms of at least substantially equal length each having a first end stationarily connected to a common point on said line perpendicular to the longitudinal center line of the measuring spindle and each having a second end connected to respective ones of the positioning arms.

8. Apparatus as set forth in claim 1 and further including means for displacement of the assembly comprising the positioning arms and the support means in the direction of the axis of the measuring spindle.

9. Apparatus as set forth in claim 8 wherein said means for displacement of said assembly comprises a guide bar which is parallel to the measuring spindle.

10. Apparatus as set forth in claim 9 wherein said guide bar is a shaft member whereby said assembly is adjustably pivotable about the guide bar in such a way that the direction of displacement of the apex point of the positioning arms intersects the axis of the measuring spindle at least substantially at a right angle.

11. Apparatus for positioning a rotary member in relation to a balancing machine measuring spindle, comprising: an elongate actuator means having first and second ends and including a linearly displaceable actuator member; means at the first end of said actuator means for mounting same in relation to the balancing machine; first and second positioning arms of at least substantially equal length and having first and second ends; means pivotally connecting the first ends of the first and second positioning arms to the actuating member; first and second link arms of at least substantially equal lengths and having first and second ends; means connecting the first ends of the link arms to the actuator means at a location at least towards the second end thereof relative to the connection between the positioning arms and the actuating member; a support member mounted to one of said positioning arms at least towards the second end thereof, for supporting the rotary member; a contact member mounted to the other of the positioning arms, at least towards the second end thereof, for steadying the rotary member carried on said support means; the arrangement being such that the positioning arms are pivotable relative to each other about their connecting point in a plane at least substantially perpendicular to the measuring spindle and the points at which the support member and the contact member are mounted to the respective positioning arms are movable along a common straight line relative to the longitudinal center line of the measuring spindle whereby the rotary member can be lifted into a position at the level of the measuring spindle with the longitudinal center line of the measuring spindle and the axis of the rotary member aligned with each other.

12. Apparatus as set forth in claim 11 and further including means for displacing the assembly of the actuator means with positioning and link arms axially towards and away from the measuring spindle.

* * * * *